United States Patent [19]
Armstrong et al.

[11] Patent Number: 5,204,027
[45] Date of Patent: Apr. 20, 1993

[54] FLUID CONTACT PANELS

[76] Inventors: Charles M. Armstrong, Rte. 3, Box 70, Timpson, Tex. 75975; Llewellyn C. Watson, Jr., Rte. 7, Box 27, Jacksonville, Tex. 75766

[21] Appl. No.: 830,863

[22] Filed: Feb. 4, 1992

[51] Int. Cl.$^5$ .............................................. B01F 3/04
[52] U.S. Cl. ................................................ 261/112.2
[58] Field of Search ..................................... 261/112.2

[56] References Cited

U.S. PATENT DOCUMENTS

| | | | |
|---|---|---|---|
| 2,793,017 | 5/1957 | Lake | 261/112 |
| 2,977,103 | 3/1961 | Smith et al. | 261/111 |
| 3,227,429 | 1/1966 | Renzi | 261/112 |
| 3,485,485 | 12/1969 | Faigle | 261/112 |
| 3,568,461 | 3/1971 | Hoffman | 261/112.2 |
| 3,612,494 | 9/1969 | Toyama | 261/112.2 |
| 3,652,066 | 3/1972 | Faigle | 261/112.2 |
| 3,704,869 | 12/1972 | Prestley | 261/112 |
| 3,792,841 | 2/1974 | Munters | 261/112 |
| 3,830,684 | 8/1974 | Hamon | 261/112.2 |
| 4,107,241 | 8/1978 | Braun | 261/79 A |
| 4,344,899 | 8/1982 | Monjoie | 261/112.2 |
| 4,477,394 | 10/1984 | Armstrong et al. | 261/112.1 |

FOREIGN PATENT DOCUMENTS

| | | | |
|---|---|---|---|
| 2748426 | 5/1978 | Fed. Rep. of Germany | 261/112.2 |
| 3901213 | 7/1990 | Fed. Rep. of Germany | 261/112.2 |
| 1314179 | 4/1973 | United Kingdom | 261/112.2 |

OTHER PUBLICATIONS

Munters "Munters Fill" brochure.

Primary Examiner—Tim Miles
Attorney, Agent, or Firm—John M. Harrison

[57] ABSTRACT

Extended surface fluid contact panels which in a preferred embodiment include a plurality of thin, waffled or corrugated half polygonal panel segments joined to define the panels, the latter of which are connected in offset, stacked relationship to define a repetitive polygonal matrix and create liquid-gas contact areas on the inside and outside surfaces of the panels. The panel matrix is vertically oriented in a staggered, layered array with respect to the tower or structure in which the panels are placed and in a most preferred embodiment, the respective panel layers are vertically arrayed and staggered by means of vertical connectors which are provided with projecting tabs that match corresponding sockets in the panels.

16 Claims, 2 Drawing Sheets

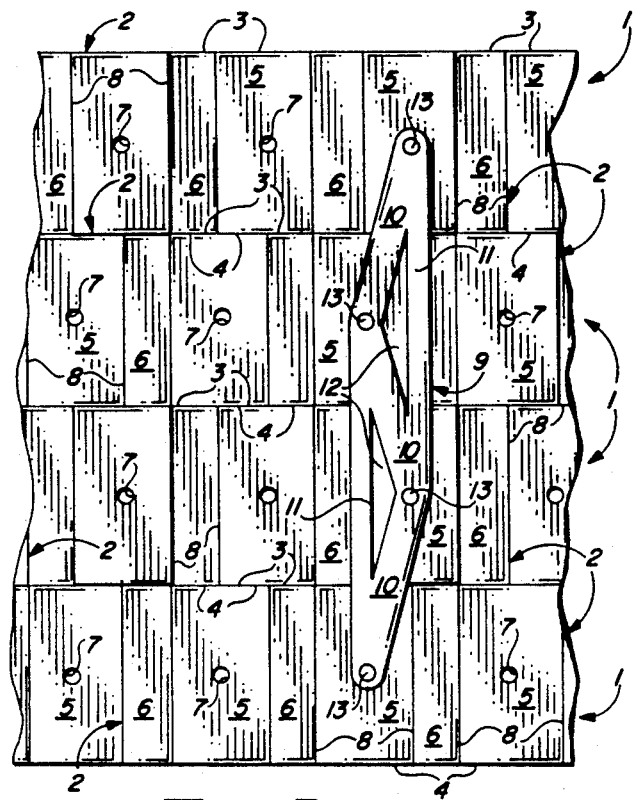
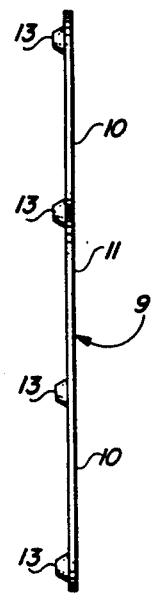
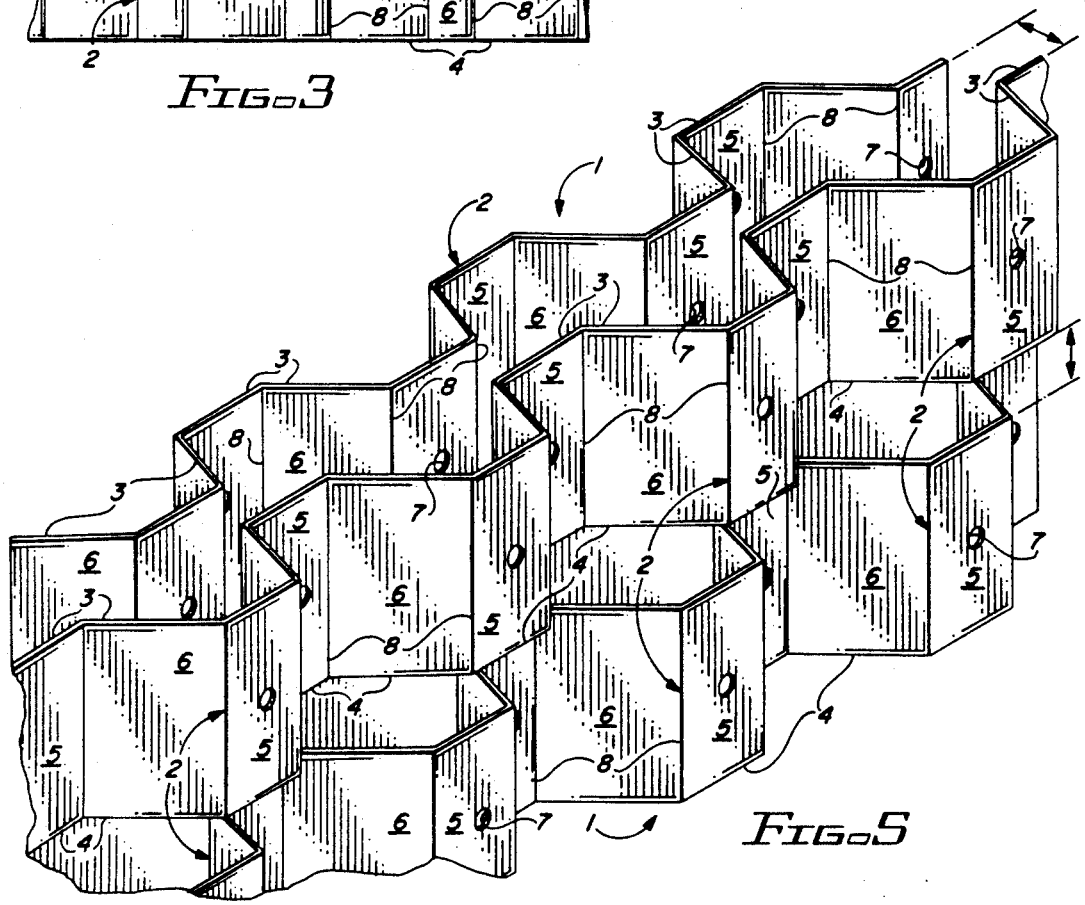

FLUID CONTACT PANELS

BACKGROUND OF THE INVENTION

1. Field of the Invention

This invention relates to contacting apparatus for mass and heat transfer operations, and more particularly, to a liquid-gas, extended surface interphase fluid contact medium defined by multiple, corrugated or waffle shaped half polygonal segments joined to define panels having a repetitive polygonal configuration and stacked in vertically staggered or offset orientation for distributing a falling liquid into a thin film in order to provide an extended liquid surface for upward-moving gas contact with the liquid. Such gas-liquid contact is used in trickle filters, absorption towers, air washer cells, stripping units, cooling towers, heat recovery economizer units and other equipment for treating, heating or cooling gases and liquids by contact between the fluids. In order to maximize efficiency, the apparatus used for effecting such gas-liquid contact should be characterized by a high void volume to effect a low resistance to the flow of fluids, a large surface area per unit of volume and a low density, in order to provide an extensive contact surface with minimum weight.

2. Description of the Prior Art

Various apparatus are known in the art for providing gas-liquid contact for the purpose of stripping gas of undesirable contaminants, cooling the gas, as in the case of cooling towers used to cool air, and other unit operations where it is necessary or desirable to expose a large liquid area in a small volume or in a short distance. Of the prior art devices designed to effect such liquid-gas contact, among the most efficient are the corrugated contact structures, such as the Munters Company "Munters Fill", which are constructed of a plastic or paper material to achieve a desirable weight reduction and to satisfy the necessary high void volume and large surface area requirements. However, problems have been experienced with many of these prior art devices, in that the falling liquid tends to "channel" or flow in streams across many of the contact surfaces rather than to completely wet the surfaces. This condition creates dry areas in the structure and reduces gas contact efficiency. In addition, excessive resistance to the flow of gas upwardly has been encountered in some of the prior art fluid contact designs and many of these structures are not sufficiently strong to permit efficient maintenance.

Typical of the liquid-gas interfacing devices known in the prior art is the contacting arrangement for mass transfer operations disclosed in U.S. Pat. No. 4,107,241, dated Aug. 15, 1978, and entitled "Contacting Apparatus for Mass Transfer Operations", to Roland Braun. This patent discloses a plurality of stacked contacting grates having a first set of parallel strips and a second set of laterally spaced strips arranged in angular relationship with respect to the first set and provided with projections which are stamped from each strip, in order to provide a large wetting surface. The plates may be manufactured of a metal or plastic material and in the latter case, may be formed by injection molding. Another liquid-gas contact device is disclosed in U.S. Pat. No. 3,830,684, dated Aug. 20, 1974, and entitled "Filling Sheets for Liquid-Gas Contact Apparatus", to Maurice Hamon, which device includes a corrugated, sheet-type, liquid-gas contact apparatus that includes multiple ramp-like deformations which are said to reduce liquid channeling, particularly in the trough portions of the corrugations. Yet another prior art fluid-contact device is disclosed in U.S. Pat. No. 2,793,017, dated May 21, 1957, to Douglas E. Lake, entitled "Apparatus for Distributing Falling Liquid in Thin Films". The Lake invention as embodied in this patent includes an assembly of corrugated sheet elements arranged in stacked relationship to provide an extended fluid contact surface for use in such devices as trickle filters, cooling towers, absorption towers, and the like. According to the disclosure, the corrugated sheet elements can be manufactured from organic thermoplastic sheet material, including a polymer or copolymer of styrene. A similar gas-liquid contacting device is disclosed in U.S. Pat. No. 3,485,485, dated Dec. 23, 1969, to Heinz Faigle, which "Cooling Screen" device is characterized by a plurality of sheets having a median longitudinal axis, with corrugations extending in the longitudinal direction on either side of this axis and offset from one another on either side of the longitudinal axis. When viewed transversely, the ridge of one of the corrugations is aligned with the valley of another corrugation, the ridges and valleys of the corrugations being equal and when viewed longitudinally, unimpeded passageways are formed between the adjacent sheets. U.S. Pat. No. 3,792,841, dated Feb. 19, 1974, and entitled "Liquid and Gas Contact Apparatus", to Carl G. Munters discloses a contact apparatus for liquid and gas which includes a contact body having first and second sets of corrugated sheets arranged with the sheets of the first set disposed alternately with the sheets of the second set. The sheet corrugations provide channels or passageways which penetrate the contact body from edge to edge, with both the horizontal and vertical components thereof defining a fluted configuration. Another fluid contact device is disclosed in U.S. Pat. No. 3,704,869, dated Dec. 5, 1972, entitled "Gas/-Liquid Film Contact Apparatus", to Ronald Priestly, and includes packing sheets which include spaced, parallel units, each of which defines a sector of a hollow, corrugated tube connected by planar portions of the sheets, the assembled sheets providing a regular array of hollow, corrugated tubes. U.S. Pat. No. 2,977,103, dated Mar. 28, 1961, to L. R. Smith, et al, discloses a "Cooling Tower Structure" which includes a rectangular, box-like container, open at the top, the sides and bottom of the container being formed of U-shaped wire members positioned by cooperating longitudinal wires. Solid metal sheets define the ends of the container and cooling plates or baffles are placed in the frame in parallel, spaced relationship to achieve the desired fluid contact. U.S. Pat. No. 3,227,429, dated Jan. 4, 1966, to P. N. Renji, details "Mass Transfer Packing" defined by packing grids arranged in stacked, staggered relationship to complete a tower packing section. Another "Fluid Contact Panel" is detailed in U.S. Pat. No. 4,477,394, dated Oct. 16, 1984, to Charles M. Armstrong, et al. The device is characterized by extended surface fluid contact panels which include multiple tubular members arranged in parallel relationship and spaced in a matrix of thin fins connecting the tubular members to create liquid-gas contact areas on the inside and outside surfaces of the tubular members and fins.

One of the problems associated with many of the prior art liquid-gas interface structures is the relatively great weight of such devices and particularly, those which are constructed of metal. Since the supporting structure which contains the contacting material must frequently support more than one layer of the material, the economics of constructing such an apparatus dictates using materials which are light in weight and yet, which provide a high percentage of voids and a large surface area for contacting the liquid and gas. Another problem which is frequently apparent in the use of prior art liquid-gas interfacing apparatus is the lack of sufficient contact surface and voids, a condition which frequently results in an excessive pressure drop across the apparatus itself. In an ideal mass transfer device, the contacting arrangement should ensure that all surfaces available for mass transfer are approximately uniformly wetted and that the entire cross-section is traversed by the gases without unused spaces or voids, such that mass transfer is maximized, with an accompanying low pressure drop in the gas stream. Furthermore, the device should present a large, extended surface area for wetting by the liquid and the apparatus should be constructed of a wetting material which is light in weight and yet resistant to the corrosive effects of the gas and/or the water or liquid stream. As heretofore described, in many such prior art devices the incoming liquid stream has a tendency to "channel" or form streams as it traverses the contact apparatus and therefore, does not wet and cover the surfaces of the apparatus to a desired extent. This "channeling" of the incoming liquid greatly reduces the area available for mass transfer, or the interaction between the gas and the water or other fluid, and lowers the efficiency of the material used as the contacting medium. This undesirable operating condition also results in a substantial reduction in interface contact between the liquid and gas, with a consequential reduction in heat transfer between the fluids.

Accordingly, it is an object of this invention to provide a new and improved waffled, corrugated matrix medium for effecting efficient contact between fluids and between a gas and a liquid in particular, which medium is characterized by a high percentage of voids, minimum pressure drop in the gas phase, reduced channeling of the downward flowing fluid and a large surface area for effecting good interphase contact between the fluid streams.

Another object of this invention is to provide a new and improved extended surface contact apparatus having multiple polygonal, and preferably hexagonal honeycomb shaped members arranged in a repeating array for use in cooling or cleaning incoming gas by using a countercurrent, downward movement of water or other liquid, which apparatus is characterized by resistance to corrosion, lightness of weight and an accompanying high percentage of voids and wettable contact surface areas, the surface areas being designed and oriented in a matrix to minimize channeling of the liquid and maximize disposition of a film of liquid on the contact surfaces to maximize the gas-liquid contact efficiency.

A still further object of this invention is to provide a new and improved, substantially inert, waffled or corrugated half polygonal contact medium joined to define panels having a repeating polygonal pattern and stacked in layers or rows in staggered configuration to effect interface contact between a gas and a liquid, the layers or rows of which medium are vertically connected in this vertically offset relationship by multiple, spaced connector members to define a matrix array of connected panels, which array is light in weight, resistant to corrosion and is further characterized by a high percentage of voids with minimum pressure drop in the gas and a large liquid-gas contact surface area and which can be utilized in substantially any heat and mass transfer operation where efficient contact between a liquid and a gas is desired.

Yet another object of this invention is to provide new and improved, honeycombed-patterned liquid-gas contactor panels of selected size and shape, which panels are formed of a thermoplastic or thermoresin material such as polypropylene or polyethylene and are created by joining half-honeycomb, waffled or corrugated strips, stacked in staggered relationship by offset connecting members for insertion in a tower, the panels being arranged in a regular recurring, horizontal honeycomb pattern or array to define a matrix which promotes efficient distribution of liquid across the inside and outside surfaces of the matrix and effects efficient mass and heat transfer between a falling liquid and a rising gas introduced into a tower or structure containing the panels.

Another object of the invention is to provide fluid-contact panels which are characterized by a stacked array of layers of polygonally-shaped panels connected in vertically staggered relationship by offset connector strips.

SUMMARY OF THE INVENTION

These and other objects of the invention are provided in new and improved extended surface fluid contact panels which are characterized by strength, lightness of weight, a high percentage of voids, efficient spacial orientation to maximize filming and reduce channeling of the liquid element and good efficiency in contacting the liquid with the gas to effect interaction between the liquid and gas to the desired extent. In a preferred embodiment of the invention the panels are characterized by multiple, vertically oriented, thermoplastic half-polygon panels, and hexagonal panels in particular, connected in horizontal orientation by spot welds and arranged in a regular recurring pattern or array to define a thin-fin matrix, which panels are capable of being fastened vertically together in end-to-end, staggered, offset relationship by means of spaced offset vertical connectors to form a fluid contact medium of selected size for specified mass and heat transfer applications.

BRIEF DESCRIPTION OF THE DRAWINGS

The invention will be better understood by reference to the accomapnying drawings, wherein:

FIG. 3 is a front elevation of a portion of the fluid contact panel array illustrated in FIG. 1;

FIG. 4 is a side view of a vertical connector for connecting fluid contact panels in a stacked, staggered array; and FIG. 5 is an exploded view of four of the half polygonal elements, more particularly illustrating construction of two fluid contact panels from the half polygonal elements.

DESCRIPTION OF THE PREFERRED EMBODIMENTS

Figure 1:
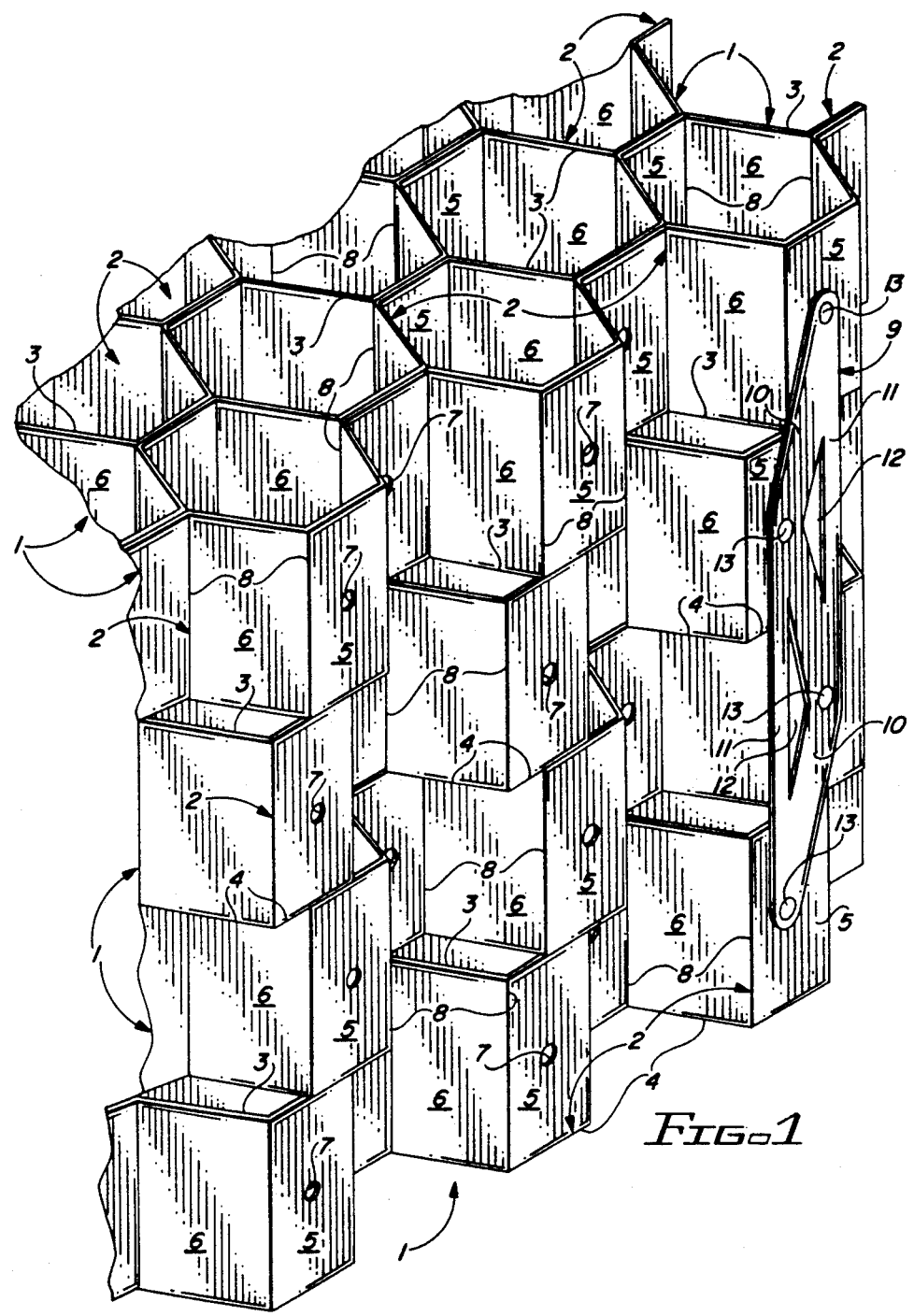
FIG. 1 is a perspective of a preferred embodiment of a portion of an array of assembled fluid contact panels of this invention.

Referring initially to FIGS. 1 and 5 of the drawings, the fluid contact panels of this invention are generally illustrated by reference numeral 1. Each of the fluid contact panels 1 is characterized by multiple half-hexagonal segments 2, each of which is waffled or corrugated to fit an adjacent hexagonal segment 2 along adjacent flat contact panels 5. Each contact panel 5 is further characterized by a weld socket 7 and lies between a pair of oblique contact panels 6, to which the contact panels 5 are connected at the respective parallel panel junctions 8. The half-hexagonal segments 2 are so designed that adjacent contact panels 5 lie in parallel, vertical planes, while the respective oblique panels 6 extend between the parallel planes and are connected to the contact panels 5 in the respective parallel planes at the panel junctions 8. Each of the contact panels 5 and oblique panels 6 have a common top edge 3 and bottom edge 4, which extend in a spaced, parallel, zigzag, waffled or corrugated pattern, as illustrated. In a most preferred embodiment of the invention the weld sockets 7 are approximately centered in the contact panels 5, respectfully, and taper from an entrance opening in the plane of the contact panels 5 to the bottom thereof, for purposes which will be hereinafter further described. As illustrated in FIG. 5, the respective half-hexagonal segments 2 are secured at the weld sockets 7 of the contact panels 5 and under circumstances where the half-hexagonal segments 2 are constructed of plastic, the contact panels 5 are thermally welded at the weld socket 7, according to the knowledge and techniques of those skilled in the art. The welding of the half-hexagonal segments 2 together define a repetitive honeycomb matrix or structure as illustrated in FIG. 1 and respective units of the honeycomb structure are stacked in layers or rows as fluid contact panels 1 in offset, staggered relationship, as further illustrated in FIG. 1.

Figure 2:
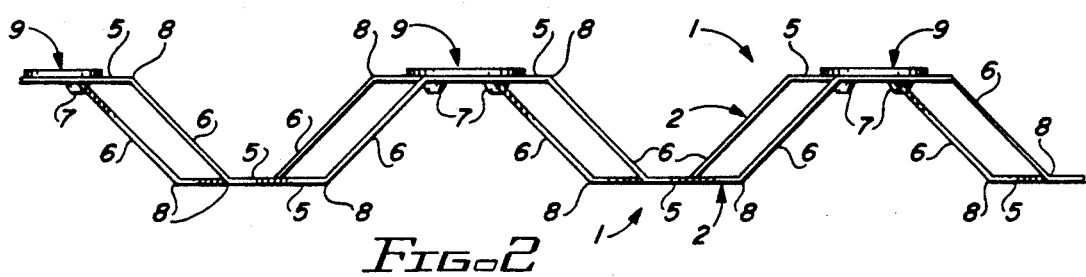
FIG. 2 is a top elevation of individual stacked half polygonal elements of the fluid contact panels illustrated in FIG. 1.

Referring now to FIGS. 1-4 of the drawings, in a preferred embodiment of the invention the respective honeycomb fluid contact panels 1, created by joining respective half-hexagonal segments 2 at the contact panels 5 using the weld sockets 7, are vertically joined in staggered, offset relationship by means of spaced vertical connectors 9. In a most preferred embodiment each of the vertical connectors 9 is characterized by a generally Z-shaped central connector strut 10, fitted with spaced weld tabs 13 that are designed to match the weld sockets 7 in selected ones of the contact panels 5 of various layers of the half-hexagonal segments 2, to join the half-hexagonal segments 2 and fluid contact panels 1 in stacked, staggered relationship, as illustrated in FIGS. 1-3. Parallel strut connectors 11 are attached to the central connector strut 10 in each case to define spaced strut openings 12, in order to brace the vertical connectors 9 and facilitate a stiff, yet light connecting device for connecting the respective layers of the fluid contact panels 1 in the manner heretofore described. The various layers of honeycomb structures created by horizontal assembly of the half-hexagonal segments 2 and stacking of the fluid contact panels 1 are joined using the vertical connectors 9 by welding the weld tabs 13 on the central connector struts 10 to corresponding weld sockets 7 located on the respective contact panels 5, using equipment well known to those skilled in the art. The degree of stagger of each respective set of the half-hexagonal segments 2 and honeycomb matrices in each layer of fluid contact panels 1 is equal to the horizontal spacing between a vertical plane drawn through a first set of weld tabs 13 in alignment with one of the parallel strut connectors 11 and the second set of weld tabs 13 aligned with the second parallel strut connector 11. It will be appreciated by those skilled in the art that this spacing may be adjusted to fit any desired set of specifications for liquid-gas contact, further according to the knowledge of those skilled in the art. For example, referring again to FIG. 2 of the drawings, this spacing is about ¼ to about ⅜ of an inch. However, the spacing will vary, depending upon the requirements of the liquid-gas contact in any specified design requirements.

It has been found that assembly of the half hexagonal segments 2 into the repetitive honeycomb configuration in the fluid contact panels 1, coupled with the corresponding stacked configuration of the fluid contact panels 1 in staggered relationship to define an array, provides an extremely efficient liquid-gas contact medium for optimizing mass and heat transfer between fluids. This feature also aids in rapid construction of the fluid contact panels 1 into a desired packing configuration. Referring again to FIGS. 1-4 of the drawings, it will be appreciated that due to the relative positions of the vertical connectors 9 when the fluid contact panels 1 are placed in stacked, staggered relationship and joined at the weld tabs 13, the contact panels 5 and oblique panels 6 in each layer will be oriented in staggered configuration with respect to each other, a condition which minimizes channeling and tends to aid in effecting efficient fluid contact. Accordingly, alternate rows of the fluid contact panels 1 are stacked in staggered relationship to achieve a fluid contact medium array of desired thickness in order to maximize this efficiency.

When it is desired to construct a fluid-contact medium or structure of specified size and shape in a tower or other structure using the fluid contact panels 1 according to the teachings of this invention, multiple honeycomb-shaped fluid contact panels 1 are created by joining the respective half hexagonal segments 2 at the weld sockets 7 of the corresponding contact panels 5 in facing relationship in discrete layers, according to the procedure outlined above with respect to FIG. 5. Multiple stacked rows or layers of this panel matrix composite are then connected by the vertical connectors 9 and are subsequently placed in the tower or structure and shaped by a saw or other means to conform the composite to the shape of the structure. Additional fluid contact panels 1 may be stacked on the original bottom array composite of fluid contact panels 1 and secured to the bottom array in staggered relationship by means of additional vertical connectors 9, as previously described above with respect to FIGS. 1-4. Multiple rows or layers of the fluid contact panels 1 can therefore be provided to realize a stacked fluid contact medium of desired height and having selected dimensions.

In a most preferred embodiment of the invention the half hexagonal segments 2 of the fluid contact panel 1 and the vertical connectors 9 are injection molded of a polymerizable material such as polypropylene, polyethylene or a similar thermoplastic or thermoresin material which may be easily shaped to conform to a tower or vessel of selected design. A preferred technique for constructing the fluid contact panels 1 is by injection molding. However, it will be appreciated that other suitable materials and methods for manufacture of the fluid contact panel of this invention can be used according to the knowledge of those skilled in the art.

It will be appreciated by those skilled in the art that while the half hexagonal segments 2 are designed to create a hexagonal honeycomb structure by way of illustration in the drawings, other polygonal shapes, including pentagons, heptagons and the like, may also be molded and assembled as described above.

While the preferred embodiments of the invention have been described above, it will be recognized and understood that various modifications may be made therein and the appended claims are intended to cover all such modifications which may fall within the spirit and scope of the invention.

Having described my invention with the particularity set forth above, what is claimed is:

1. Fluid contact panels comprising an array of corrugated waffled members having a repetitive half polygon pattern, said corrugated waffled members joined and stacked in staggered relationship to define discreet layers of said array and a plurality of vertical connectors, each of said vertical connectors having at least two weld tips disposed in spaced relationship for engaging selected ones of said corrugated, waffled members in said layers and joining said layers of said array in said staggered relationship.

2. The fluid contact panels of claim 1 wherein said half polygon further comprises a half hexagon.

3. The fluid contact panels of claim 1 further comprising weld sockets provided in said corrugated, waffled members for welding said corrugated, waffled members together.

4. The fluid contact panels of claim 3 wherein said at least two weld tips further comprises four weld tips, with a first set of two of said four weld tips disposed in a first vertical plane for engaging first selected ones of said weld sockets and securing first and third layers of said corrugated, waffled members substantially in alignment with each other and a second set of two of said four weld tips disposed in a second vertical plane lying substantially parallel to said first vertical plane, for engaging second selected ones of said weld sockets and securing second and fourth layers of said pairs of said corrugated, waffled members substantially in alignment with each other, whereby said first and third layers are offset and staggered with respect to said second and fourth layers.

5. The fluid contact panels of claim 4 wherein said half polygon further comprises a half hexagon.

6. The fluid contact panels of claim 1 wherein said at least two weld tips further comprises four weld tips, with a first set of two of said four weld tips disposed in a first vertical plane for securing first and third layers of said corrugated, waffled members substantially in alignment with each other and a second set of two of said four weld tips disposed in a second vertical plane lying substantially parallel to said first vertical plane, for securing second and fourth layers of said pairs of said corrugated, waffled members substantially in alignment with each other, whereby said first and third layers are offset and staggered with respect to said second and fourth layers.

7. The fluid contact panels of claim 6 wherein said vertical connectors are shaped generally in the configuration of parallelogram and further comprising a generally Z-shaped central connector strut defining a first set of parallel legs of said parallelogram and a pair of strut connectors connecting opposite ends of said central connector strut to define a second set of parallel legs of said parallelogram.

8. The fluid contact panels of claim 7 wherein said weld tips are located on said central connector strut in spaced, staggered relationship.

9. The fluid contact panels of claim 8 wherein said half polygon further comprises a half hexagon.

10. A fluid contact medium comprising a plurality of fluid contact panels defined by connected pairs of corrugated, waffled plates, each of said plates having a repetitive half polygon pattern to define a repetitive polygon pattern in said fluid contact panels, said fluid contact panels arranged in vertical layers in stacked, offset relationship and a plurality of vertical connectors, each of said vertical connectors having a plurality of weld tips disposed in spaced relationship for engaging said corrugated waffled members and joining said vertical layers in said stacked, offset relationship.

11. The fluid contact medium of claim 10 wherein said half polygon further comprises a half hexagon and said polygon further comprises a hexagon.

12. The fluid contact medium of claim 10 wherein said vertical connectors are shaped generally in the configuration of a parallelogram and further comprising a generally Z-shaped central connector strut defining a first set of parallel legs of said parallelogram and a pair of strut connectors connecting opposite ends of said central connector strut to define a second set of parallel legs of said parallelogram.

13. The fluid contact medium of claim 12 wherein said half polygon further comprises a half hexagon and said polygon further comprises a hexagon.

14. An array of fluid contact panels for effecting efficient fluid contact in a vessel, said fluid contact panels comprising a plurality of corrugated thermoplastic plates shaped in a repetitive half polygon configuration and connected in at least two horizontal layers to define a repetitive polygon pattern in each layer and a plurality of vertical connectors, each of said vertical connectors having at least two weld tips disposed in spaced relationship for engaging selected ones of said corrugated thermoplastic plates in said layers and connecting said layers in said staggered relationship.

15. The array of claim 14 wherein said at least two layers further comprises a plurality of layers of said fluid contact panels and said at least two weld tips further comprises four weld tips, with a first set of two of said four weld tips disposed in a first vertical plane for securing first and third layers of said corrugated thermoplastic plates substantially in alignment with each other and a second set of two of said four weld tips disposed in a second vertical plane lying substantially parallel to said first vertical plane, for securing second and fourth layers of said pairs of said corrugated thermoplastic plates substantially in alignment with each other, whereby said first and third layers are offset and staggered with respect to said second and fourth layers and said vertical connectors are shaped generally in the configuration of a parallelogram and wherein each of said vertical connectors further comprises a generally Z-shaped central connector strut defining a first set of parallel legs of said parallelogram and a pair of strut connectors connecting opposite ends of said central connector strut to define a second set of parallel legs of said parallelogram.

16. The array of claim 15 wherein said half polygon further comprises a half hexagon and said weld tips are located on said central connector strut in spaced, staggered relationship.

* * * * *